UNITED STATES PATENT OFFICE.

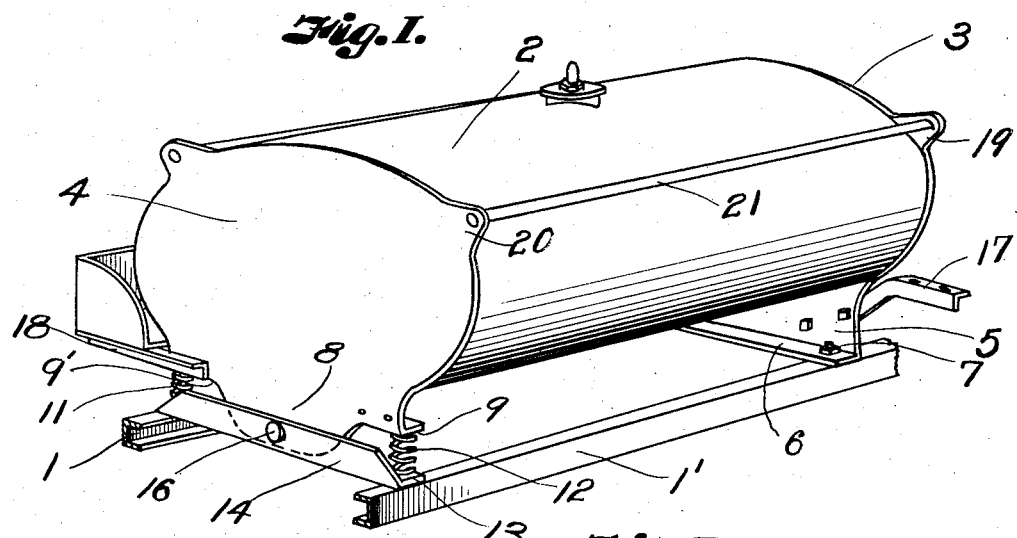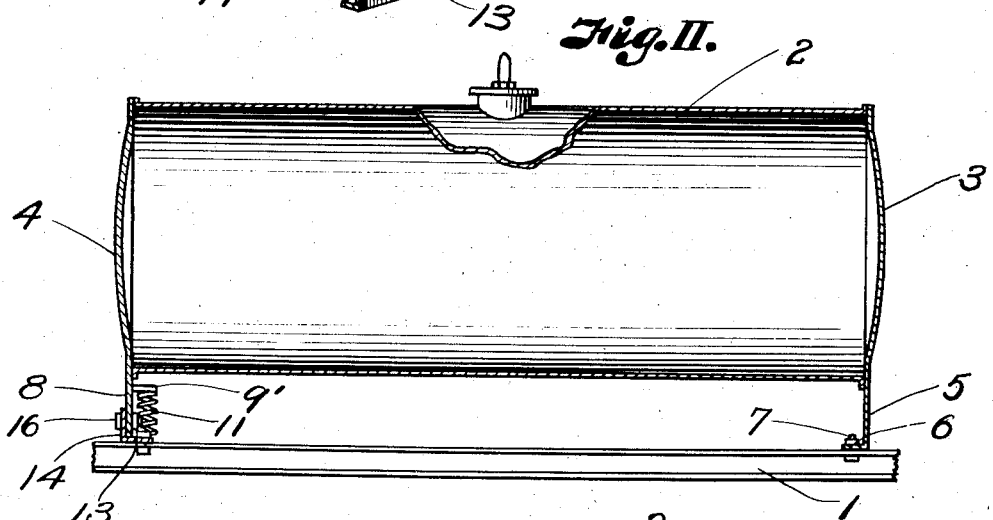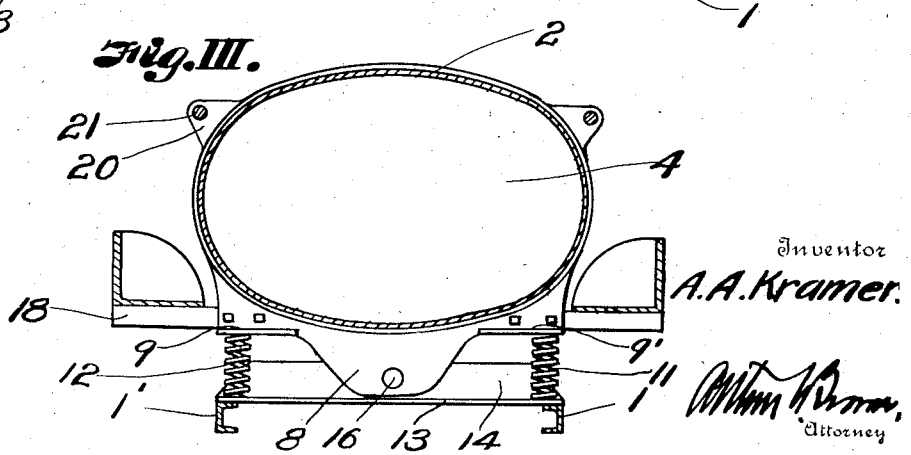

ANDREW A. KRAMER, OF KANSAS CITY, MISSOURI.

WAGON-TANK CONSTRUCTION.

1,365,110.   Specification of Letters Patent.   Patented Jan. 11, 1921.

Application filed March 24, 1919. Serial No. 284,721.

*To all whom it may concern:*

Be it known that I, ANDREW A. KRAMER, a citizen of the United States, residing at Kansas City, in the county of Jackson and State of Missouri, have invented certain new and useful Improvements in Wagon-Tank Constructions; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to portable tanks generally known as wagon tanks and one of the objects of the invention is to construct a tank and a support therefor in such manner that the twisting strains of the vehicle will not be communicated to the tank. In order to obviate the liability of the twisting strains of the wagon frame being communicated to the tank I have provided a three-point support for the tank, which will permit relative movement of the wagon frame independent of the tank, as will appear hereinafter.

In the drawings,

Figure I is a detail perspective view of a tank constructed in accordance with my invention.

Fig. II is a vertical longitudinal sectional view through the same, and

Fig. III is a transverse sectional view through the tank.

Referring now to the drawings by numerals of reference:

1 and 1' designate the side rails of the chassis frame of a vehicle upon which the tank is mounted. The tank may consist of the tubular body portion 2 having end heads or sheets 3 and 4 preferably secured thereto by autogenous welding. One of the sheets, for example 3, may have a depending integral portion 5 providing a bolster with a laterally projecting anchoring flange 6 adapted to be bolted to the chassis frame by bolts 7, the flange 6 preferably extending entirely across the frame so that a rigid connection is made at one end between the tank support and the frame. The other end sheet, for example 4, is provided with a depending pivot-engaging portion 8 and spring seats 9 and 9' on opposite ends thereof, the spring seats being in the form of angles so that one end of each of the springs 11 and 12 may abut against the seat and the other end rest upon the flange 13 of the supporting bar 14 which is bolted to the rails 1 and 1' of the frame. The pivot-engaging depending portion 8 is connected to the support or angle 14 by a pivot 16 whereby there may be relative movement of the frame with respect to the tank.

If desired, can rack supporting arms 17 and 18 may be provided on the bolster 5 and the depending portion 8 respectively and the respective ends 3 and 4 may be provided with outstanding rod supporting brackets 19 and 20 for the rods 21, as best shown in Fig. I.

From the foregoing it will be apparent that an efficient three-point support may be provided for a tank so that there may be relative movement of the wagon body or supporting frame independent of the tank and it will be further apparent that any shocks or strains from the wagon frame will be communicated to the sheets 3 and 4 rather than to the tubular portion 2 of the tank since the tubular portion 2 constitutes substantially a box girder terminally supported by the ends 3 and 4.

Having thus described my invention, what I claim as new therein, and desire to secure by Letters-Patent is:

1. In combination with a flexible frame, a tank body having stabilizing support at one end of the frame, and having pivotal support at the other end of the frame on an axis longitudinal relative to the frame and tank body.

2. In combination with a flexible frame, a tank body spaced from the frame having two point support on one end of the frame and a single, pivotal support at the opposite end of the frame, the supporting pivot being longitudinal relative to the frame and tank body to permit the frame to flex independently of the body.

3. In combination with a flexible frame, a tank body spaced from the frame having two point support on one end of the frame and a single, pivotal support at the opposite end of the frame, the supporting pivot being longitudinal relative to the frame and tank body to permit the frame to flex independently of the body, and springs connected with the frame and body at opposite sides of the pivot for the purpose set forth.

4. In combination with a frame comprising side rails, a tank body, a bolster connected with said rails at one end of the frame and supporting the corresponding end of the tank body, a cross bar at the opposite end of the frame, and pivotal connection between the tank body and cross bar, permitting movement of the frame relative to the body on a longitudinal axis.

5. The combination with a tank supporting frame, a tank above the frame, a bolster integral with the end of the tank and rigidly connected to the frame, an integral depending portion on the other end of the tank, and a member across the frame pivotally connected to the depending portion near the longitudinal center of said frame.

6. The combination with a tank supporting frame, a tank above the frame having end sheets for closing the same, a depending integral portion on one of the end sheets rigidly connected to the frame, an integral depending portion on the other end sheet for connecting the tank to the frame near the longitudinal center thereof, spring seats on the last named end sheet and on opposite sides of the depending portion, and springs between the frame and the spring seats.

7. The combination with a tank supporting frame, a tank rigidly connected at one end to the frame, means carried by the tank pivotally connecting it to the frame near the longitudinal center thereof, spring seats on the opposite side near the longitudinal center of the frame, and springs, one end of each spring bearing against a part on the frame and the other end abutting against the spring seats.

8. A tank comprising a tubular body portion, a sheet closing one end of said tubular portion and having an integral supporting bolster, a sheet closing the opposite end of said tubular portion and having an integral depending pivot-engaging projecting portion, and depending spring seats carried by the end sheet.

In testimony whereof I affix my signature.

ANDREW A. KRAMER.